(12) United States Patent
Ollagnier et al.

(10) Patent No.: US 11,274,926 B2
(45) Date of Patent: Mar. 15, 2022

(54) METHOD FOR ASSISTING WITH NAVIGATION

(71) Applicant: SAFRAN ELECTRONICS & DEFENSE, Paris (FR)

(72) Inventors: Isabelle Ollagnier, Paris (FR); Philippe Elie, Paris (FR)

(73) Assignee: SAFRAN ELECTRONICS & DEFENSE, Paris (FR)

(*) Notice: Subject to any disclaimer, the term of this patent is extended or adjusted under 35 U.S.C. 154(b) by 0 days.

(21) Appl. No.: 17/256,589

(22) PCT Filed: Jun. 26, 2019

(86) PCT No.: PCT/EP2019/067096
§ 371 (c)(1),
(2) Date: Dec. 28, 2020

(87) PCT Pub. No.: WO2020/002482
PCT Pub. Date: Jan. 2, 2020

(65) Prior Publication Data
US 2021/0247188 A1    Aug. 12, 2021

(30) Foreign Application Priority Data
Jun. 29, 2018  (FR) .................... 18 56053

(51) Int. Cl.
*G01C 23/00* (2006.01)
*G01C 21/20* (2006.01)
(Continued)

(52) U.S. Cl.
CPC ......... *G01C 21/005* (2013.01); *G01C 21/203* (2013.01); *G01C 23/00* (2013.01);
(Continued)

(58) Field of Classification Search
CPC .... G08G 5/0008; G08G 5/0047; G01C 23/00; G01S 7/22
(Continued)

(56) References Cited

U.S. PATENT DOCUMENTS 4,862,594 A * 9/1989 Schierbeek ............ G01C 17/26
                                                   33/356
5,369,589 A * 11/1994 Steiner ..................... G01S 7/22
                                                   701/538
(Continued)

FOREIGN PATENT DOCUMENTS

FR         3007545 A1     12/2014

OTHER PUBLICATIONS

LIDAR-inertial integration for UAV localization and mapping in complex environments; Roberto Opromolla;Giancarmine Fasano; Giancarlo Rufino;Michele Grassi;Al Savvaris; 2016 International Conference on Unmanned Aircraft Systems (ICUAS); IEEE Conference Paper. (Year: 2016).*

(Continued)

*Primary Examiner* — Cuong H Nguyen
(74) *Attorney, Agent, or Firm* — Muncy, Geissler, Olds & Lowe, P..C.

(57) ABSTRACT

A method of assisting navigation of a vehicle, the method comprising the steps of: at predetermined instants, determining first positions and second positions of the vehicle by different positioning means and calculating the discrepancy between each pair of first and second positions; comparing the discrepancy with a warning threshold; defining a reference frame on a screen, the reference frame being centered on a reference point corresponding to the most recent first position; and symbolizing the discrepancies on the screen by allocating a symbol to each discrepancy and by positioning each symbol on the screen, relative to the reference point, (Continued)

while taking account both of the value of the discrepancy and also of the path travelled by the vehicle since calculating the discrepancy, the first symbols being provided with respective chronological indicators.

11 Claims, 5 Drawing Sheets

(51) Int. Cl.
    *G01C 21/00* (2006.01)
    *G01S 7/22* (2006.01)
    *G08G 5/00* (2006.01)

(52) U.S. Cl.
    CPC .............. *G01S 7/22* (2013.01); *G08G 5/0008* (2013.01); *G08G 5/0047* (2013.01)

(58) Field of Classification Search
    USPC ..................... 701/445, 518; 340/995.27, 990
    See application file for complete search history.

(56) References Cited

U.S. PATENT DOCUMENTS

| | | | | |
|---|---|---|---|---|
| 5,574,648 | A * | 11/1996 | Pilley | G01C 23/00 340/945 |
| 6,111,526 | A * | 8/2000 | Aymeric | G05D 1/0676 244/181 |
| 6,661,434 | B1 * | 12/2003 | MacPhail | G06F 3/0481 715/772 |
| 8,447,064 | B2 * | 5/2013 | Rhoads | G01C 11/00 382/100 |
| 9,626,837 | B2 * | 4/2017 | Katz | G07F 17/3258 |
| 10,089,894 | B1 * | 10/2018 | Chandrashekarappa | B64D 45/04 |
| 10,366,615 | B2 * | 7/2019 | Chandrashekarappa | G01C 21/32 |
| 10,378,920 | B2 * | 8/2019 | Hodge | G02B 27/017 |
| 10,822,110 | B2 * | 11/2020 | Colby | G01S 7/021 |
| 2003/0122701 | A1 * | 7/2003 | Tran | G08G 5/0008 342/29 |
| 2008/0080737 | A1 * | 4/2008 | Rhoads | G06F 16/29 382/100 |
| 2008/0119970 | A1 * | 5/2008 | Campbell | G05D 1/0676 701/8 |
| 2010/0023262 | A1 * | 1/2010 | Haney | G01C 21/203 701/469 |
| 2011/0035170 | A1 * | 2/2011 | Flake | H04L 25/03834 702/79 |
| 2014/0375479 | A1 * | 12/2014 | Mazoyer | G01C 23/00 340/971 |
| 2017/0183104 | A1 * | 6/2017 | Colby | G01C 21/00 |
| 2018/0022358 | A1 * | 1/2018 | Fung | G06K 9/00906 701/36 |
| 2019/0096271 | A1 * | 3/2019 | Chandrashekarappa | G08G 5/0013 |

OTHER PUBLICATIONS

A UAV system for inspection of industrial facilities;Janosch Nikolic;Michael Burri;Joern Rehder;Stefan Leutenegger;Christoph Huerzeler;Roland Siegwart; 2013 IEEE Aerospace Conference; IEEE Conference Paper (Year: 2013).*

* cited by examiner

METHOD FOR ASSISTING WITH NAVIGATION

The present invention relates to a method of assisting navigation such as navigation at sea, on land, or in the air.

TECHNOLOGICAL BACKGROUND

Nowadays, most vehicles that are to cover distances of several hundreds of kilometers are provided with receivers for receiving satellite signals from satellites in a constellation belonging to a satellite positioning or location system. Each signal includes the time at which it was transmitted by the satellite and information enabling the position of the transmitting satellite to be determined. On the basis of each received signal, the receiver can determine the distance between itself and the satellite such that, from at least four signals coming from different satellites, the receiver can determine:

an accurate time; and
its x, y, z coordinates in a predetermined reference frame.

These systems are known as position navigation time (PNT) systems in that they are arranged to be capable of supplying:

the current position of the vehicle on which the receiver is located;
navigation guidance from the current position towards a desired position; and
accurate time information.

Several systems of this type exist, and the best known are the GPS, GALILEO, GLONASS, and BEIDU systems.

Other navigation means are also known, such as:
inertial navigation;
celestial or "astral" navigation;
navigation using landmarks (which landmarks may be detected by an optoelectronic device); and
navigation using radar points; . . . .

It can be understood that during a long journey, navigation needs to be as accurate as possible.

OBJECT OF THE INVENTION

An object of the invention is to provide means for ensuring that on-going navigation is reliable.

BRIEF SUMMARY OF THE INVENTION

To this end, the invention provides a method of assisting navigation of a vehicle fitted at least with a first positioning device and with a second positioning device, the method comprising the steps of:

at predetermined instants, causing first positions of the vehicle to be determined by the first positioning device and second positions of the vehicle to be determined by the second positioning device, and calculating the value of a first discrepancy between each first position and the second position at the same instant; and
comparing the value of the first discrepancy with a first threshold, and issuing a first warning when the value of the first discrepancy is greater than the first threshold;
the method further comprising the steps of:
defining on a screen of the vehicle both a reference point corresponding to a current position of the vehicle determined from the most recent first position and also a surrounding zone around the reference point and constituting a two-dimensional representation, at a predetermined scale and in a predetermined reference frame, of a portion of the space surrounding the vehicle; and
symbolizing the first discrepancies on the screen by allocating a first symbol to each first discrepancy and by positioning each first symbol on the screen, relative to the reference point, while taking account both of the value of the first discrepancy and also of the path travelled by the vehicle since calculating the value of the first discrepancy, the first symbols being provided with respective chronological indicators.

Thus, the invention makes it possible to inform the person driving a vehicle about the trustworthiness of the available positioning means.

Other characteristics and advantages of the invention appear on reading the following description of a particular, nonlimiting implementation of the invention.

BRIEF DESCRIPTION OF THE DRAWINGS

Reference is made to the accompanying drawings, in which.

DETAILED DESCRIPTION OF THE INVENTION

Figure 1:
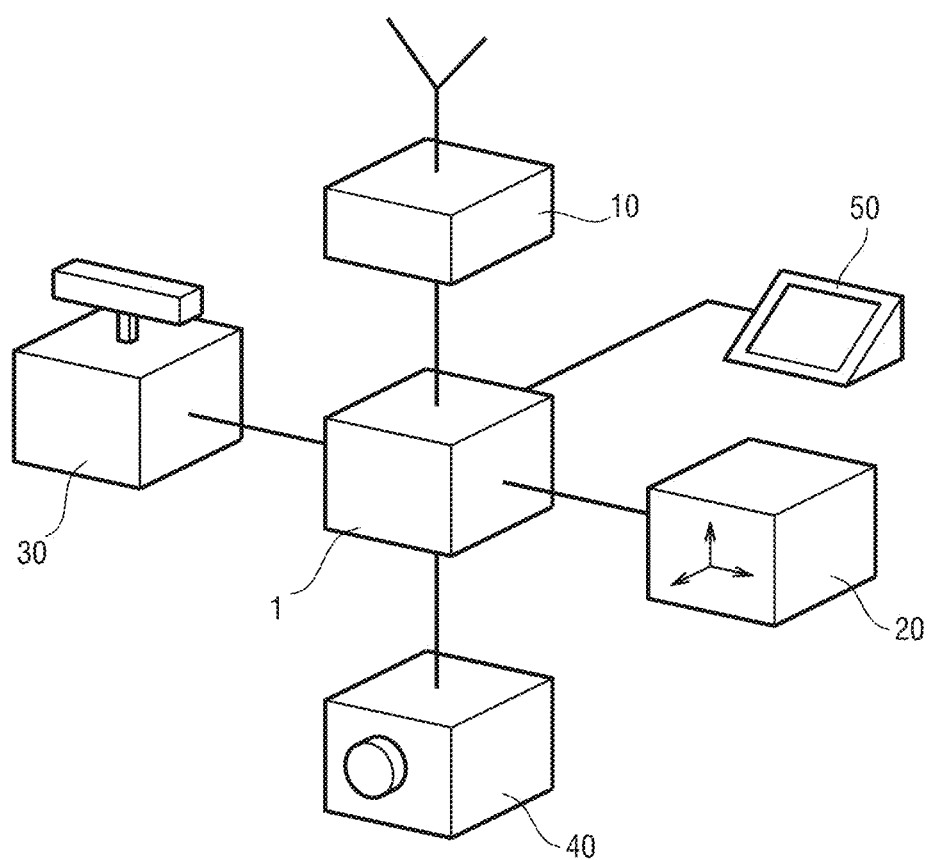
FIG. 1 is a diagrammatic perspective view of a navigation assistance system of the invention.

With reference to FIG. 1, the invention is described in this example in its application to a vehicle, and more particularly to a ship, that has an electronic control unit 1 that is connected firstly to control instruments situated on the bridge of the ship to enable the crew to control the ship, and secondly to actuators that act on the steering and the propulsion means of the ship.

The electronic control unit 1 is a computer that comprises, in conventional manner, one or more processors associated with a memory containing computer programs. At least one of the computer programs includes instructions arranged to enable the ship to be controlled and to cause the ship to follow a navigation route.

The electronic control unit 1 is also connected to:
a first positioning device 10 for satellite positioning;
a second positioning device 20 for inertial positioning;
a third positioning device 30 for radar positioning;
a fourth positioning device 40 for celestial positioning; and
a screen 50.

In conventional manner, the satellite positioning device 10 comprises an electronic receiver and processor unit for receiving and processing signals coming from satellites belonging to a satellite constellation (GPS, GALILEO, GLONASS, and/or BEIDU). The electronic receiver and processor unit comprises a computer processor circuit including calculation means and a memory containing a computer program having instructions arranged to calculate both the current position of the ship and also a navigation route between the current position of the ship and a destination point specified by an operator. The electronic receiver and processor unit supplies the following to the electronic control unit 1:

a first current position of the ship;
a heading indication;
a first clock signal (date and time);
the remaining distance to the destination point; and an estimated time of arrival, . . .

The inertial positioning device 20 comprises an inertial navigation unit. In conventional manner, such a unit comprises a computer processor circuit connected to accelerometers and to gyros arranged along three axes of a measurement reference frame in order to detect the movements of the ship parallel to the axes of the measurement reference frame and about said axes. The inertial unit supplies the following to the electronic control unit 1:

a second current position of the ship determined from the detected movements; and a second clock signal, . . .

In conventional manner, the radar positioning device 30 comprises a computer processor circuit connected to a radar antenna. The computer processor circuit executes a program that is stored in a memory and that contains instructions arranged to determine a third current position of the ship from the shape of the coast. The radar positioning device 30 supplies this third current position to the electronic control unit 1.

In conventional manner, the celestial positioning device 40 comprises a computer processor circuit that is connected to an optoelectronic image sensor having a field of view pointed to observe the sky. The computer processor circuit comprises a memory containing ephemerides and a computer program containing instructions arranged to enable the computer processor circuit to use the ephemerides and the first clock signal communicated by the electronic control unit 1 to identify stars present in the field of view of the optoelectronic sensor and to deduce a fourth current position of the ship therefrom. The celestial positioning device supplies the fourth current position of the ship to the electronic control unit 1.

The electronic control unit 1 is programmed:
at predetermined instants, to cause the satellite positioning device 10 to determine first current positions;
at each of the same instants, to cause the inertial positioning device to determine a second current position, to calculate the value of a first discrepancy between the first current position and the second current position, to compare the value of the first discrepancy to a first threshold, and to issue a first warning when the value of the first discrepancy is greater than the first threshold;
at each of the same instants, to cause the radar positioning device 30 to determine a third current position, to calculate the value of a second discrepancy between the first current position and the third current position, to compare the value of the second discrepancy to a second threshold, and to issue a second warning when the value of the second discrepancy is greater than the second threshold (see FIG. 3, for example); and
at each of the same instants, to cause the celestial positioning device 40 to determine a fourth current position, to calculate the value of a third discrepancy between the first current position and the fourth current position, to compare the value of the third discrepancy to a third threshold, and to issue a third warning when the value of the third discrepancy is greater than the third threshold.

By way of example, the warnings may be used to switch on a light on the screen 50, a control panel of the bridge, and/or are listed in a report to which the crew has access.

The electronic control unit 1 is programmed to display information on the screen 50 that is located on the bridge so as to be visible for the crew.

The electronic control unit 1 is programmed to define a first display zone Z1 and a second display zone Z2 on the screen 50. The zones Z1 and Z2 are preferably adjacent so as to be viewed simultaneously.

The display zone Z1 shows the heading followed by the ship, specifically in the form of a graduated ring 101 that moves past a pointer 102 situated at the top of the zone Z1 in such a manner that the graduation of the graduated ring 101 that is facing the pointer 102 corresponds to the heading followed by the ship.

The electronic control unit 1 is programmed to define a reference frame in the zone Z2 of the screen 50. The reference frame has its origin at the center of the screen 50 and serves to provide a two-dimensional representation at a predetermined scale of a portion of the space surrounding the ship. The center of the reference frame constitutes a reference point 200 and is continuously centered on the first current position, and a reference axis is continuously aligned with the heading being followed by the ship. A simplified graduated ring 201 that turns in correspondence with the graduated ring 101 is also displayed, and it defines the boundary of the portion of the space surrounding the ship.

The electronic control unit 1 is programmed:
to symbolize the first discrepancies on the screen 50 by allocating a first symbol S1, specifically a downwardly-pointing triangle, to each first discrepancy and by positioning each first symbol S1 in the zone Z2 relative to the reference point, while taking account both of the value of the first discrepancy and also of the path travelled by the ship since calculating the value of the first discrepancy. The first symbols S1 are provided with a chronological indicator, specifically a dot for the most recently calculated discrepancy and then a number 1, 2, 3, 4, or 5 (with the next most recent first discrepancy after the most recently calculated discrepancy having the indicator 1, while the oldest first discrepancy has the indicator 5);
to symbolize the second discrepancies on the screen by allocating a second symbol S2, specifically an upwardly-pointing triangle, to each second discrepancy and by positioning each second symbol S2 in the zone Z2 relative to the reference point, while taking account both of the value of the second discrepancy and also of the path travelled by the ship since calculating the value of the second discrepancy (the second symbols are likewise provided with respective chronological indicators, like the first symbols); and
to symbolize the third discrepancies on the screen by allocating a third symbol S3, specifically a disk, to each third discrepancy and by positioning each third symbol S3 in the zone Z2 relative to the reference point, while taking account both of the value of the third discrepancy and also of the path travelled by the ship since calculating the value of the third discrepancy (the third symbols are likewise provided with respective chronological indicators, like the first symbols).

In the present implementation, a new discrepancy is displayed once every three hours, given the length of the voyage and the travel speed of the ship. For shorter journeys or faster vehicles, the discrepancies may be added at a faster rate. The discrepancies that are calculated in between times serve only to generate warnings and they are not displayed. In a variant, it may be decided either to ignore those discrepancies that are not used for display purposes, or else to calculate the discrepancies at the display rate.

Preferably, the electronic control unit 1 is programmed to modify the appearance of the symbols S1, S2, and S3 as a function of the values of the first, second, and third discrepancies. For example, the color of a symbol may vary from green to red passing via orange as a function of the value of the corresponding discrepancy. Provision may be made for the symbol to go from green to orange when the discrepancy exceeds half the warning threshold and to turn red when the discrepancy exceeds the warning threshold.

It can be understood that:

when a discrepancy has just been calculated and the value of the discrepancy is zero, the symbol corresponding to the discrepancy is displayed at the center of the reference frame on the reference point 200, and with the chronological indicator ".";

if the value of the discrepancy is not zero, the symbol is displayed in the zone around the reference point 200, but offset from the reference point 200 by a distance that correspond to the value of the discrepancy, taking account of the scale of the reference frame, and with the chronological indicator ".";

as the length of time between the present instant and the instant at which the discrepancy was calculated increases, the corresponding symbol is displayed at a distance from the reference point 200 that corresponds both to the value of the discrepancy and also to the distance travelled by the ship in said length of time (taking account of the scale of the reference frame), however if the distance at which the symbol is to be positioned is greater than the distance covered by the zone surrounding the reference point 200 (which distance is symbolized by the graduated ring 201), then the discrepancy ceases to be displayed;

since the reference frame is aligned with the heading and since the path is rectilinear, symbols corresponding to discrepancies of zero are normally in alignment on a rearwardly-directed straight line from the reference point 200 (see FIG. 3 for example); and the chronological indicator remains the same so long as a new discrepancy has not been calculated, and each time a new discrepancy is calculated, the symbol corresponding to the new discrepancy is displayed with the chronological indicator ".", while the chronological indicators of each of the symbols corresponding to older discrepancies are incremented by one.

The crew can thus see whether they can trust the satellite navigation device 10, which is the primary navigation device, since it is the device that supplies the heading to be followed.

If all of the discrepancies having the same chronological indicator are displayed in an offset location (as applies to the chronological indicator 3 in FIG. 2), it can be assumed that the satellite navigation device 10 is faulty. The crew then needs to verify whether the next discrepancies are also offset, and if so, they need to adapt navigation accordingly.

Figure 3:
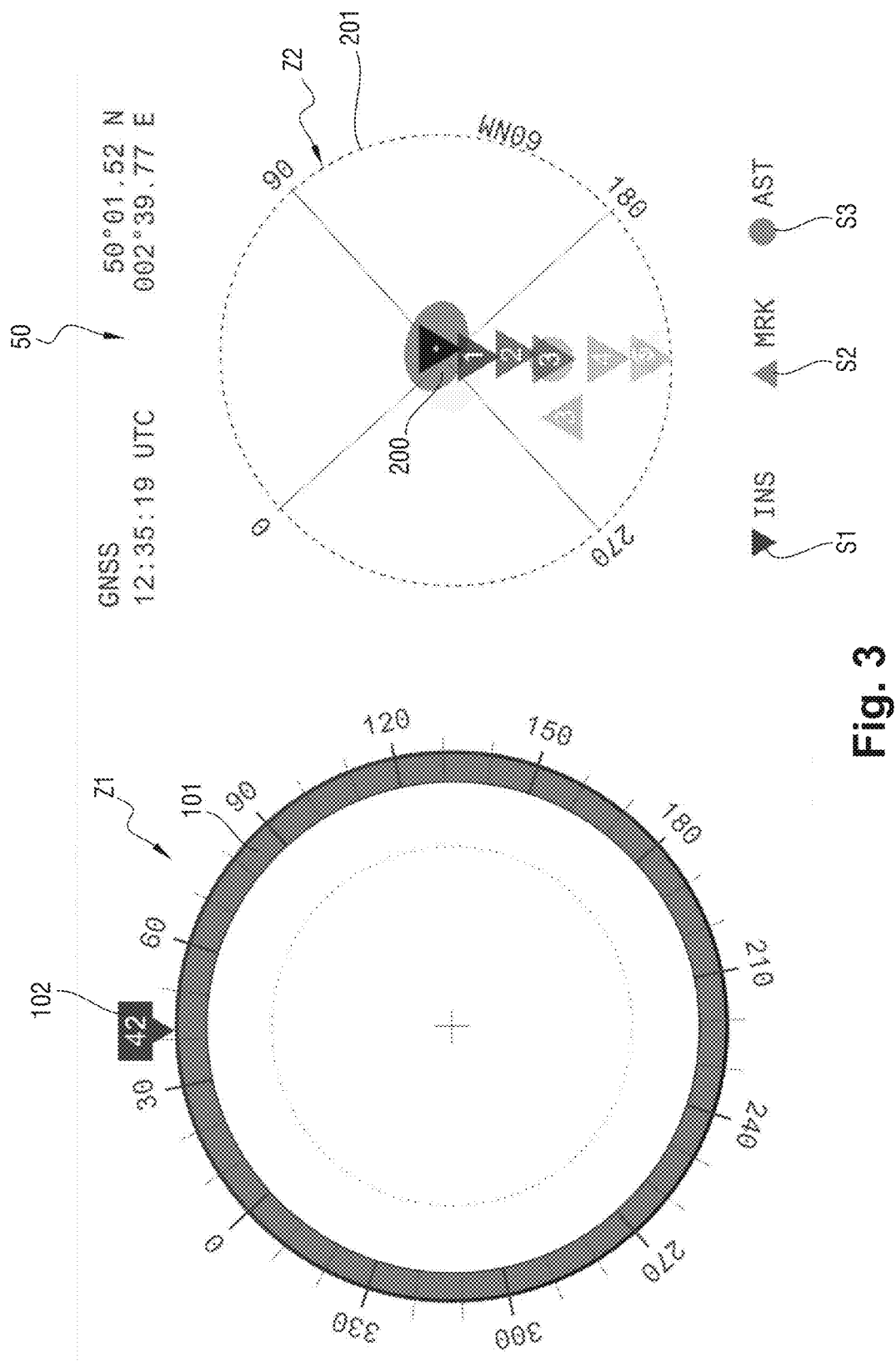

In FIG. 3, the symbols S1 and S3 having the chronological indicator "3" are grouped together on the vertical line behind the reference point, while the symbol S2 having the chronological indicator "3" is offset: it can be deduced that the radar positioning device 30 was faulty at that instant.

Figure 4:
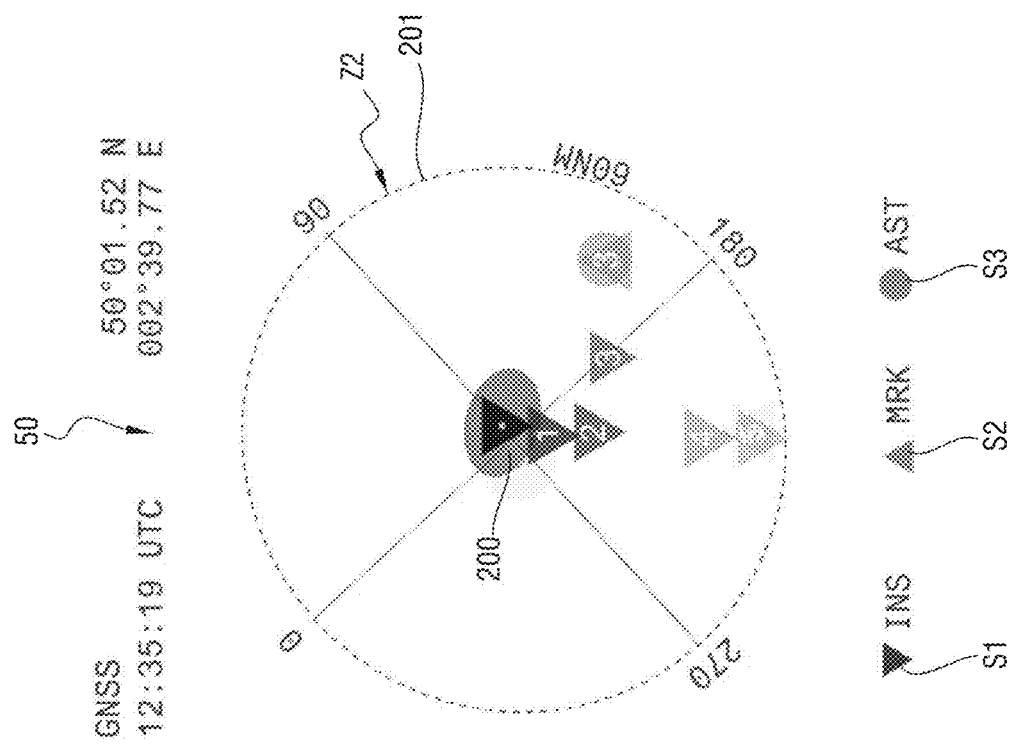
Figure 4:
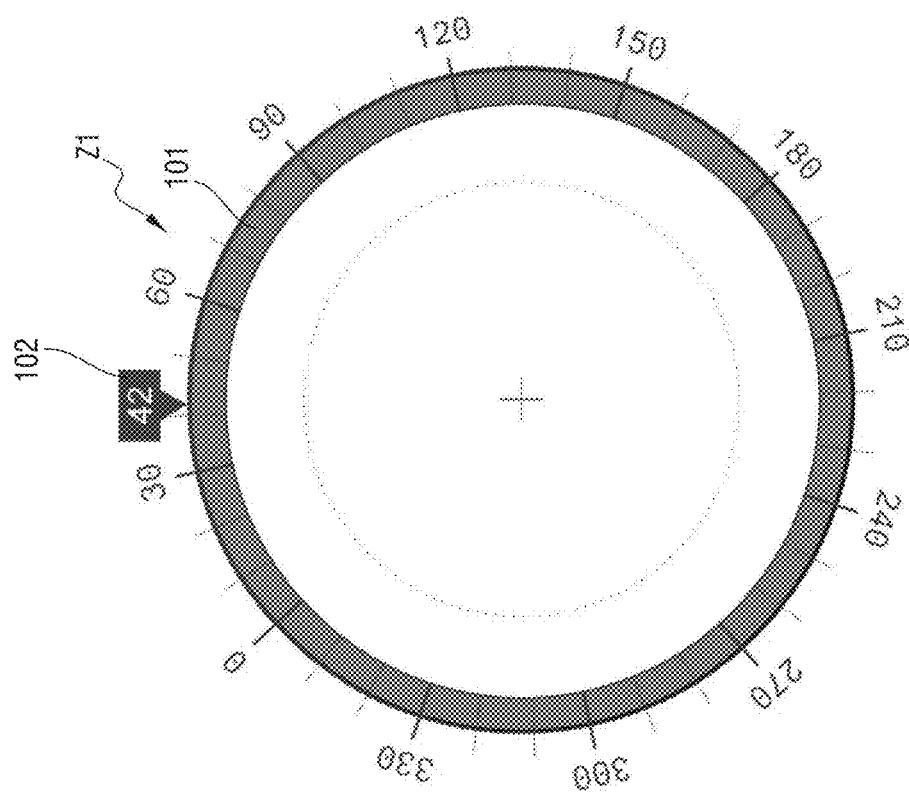

In FIG. 4, all of the symbols having the chronological indicator "3" are offset. The symbols S2 and S3 having the chronological indicator "3" are superposed, while the symbol S1 having the chronological indicator "3" is offset from the other two: it can be deduced that the satellite positioning device 10 and the inertial positioning device 20 were faulty at that instant. It should be observed that since the symbols S2 and S3 are superposed, the two positions supplied respectively by the radar positioning device 30 and by the celestial positioning device 40 correspond to each other: a priori the clock signal supplied by the satellite positioning device 10 and used by the celestial positioning device 40 is correct.

Figure 5:
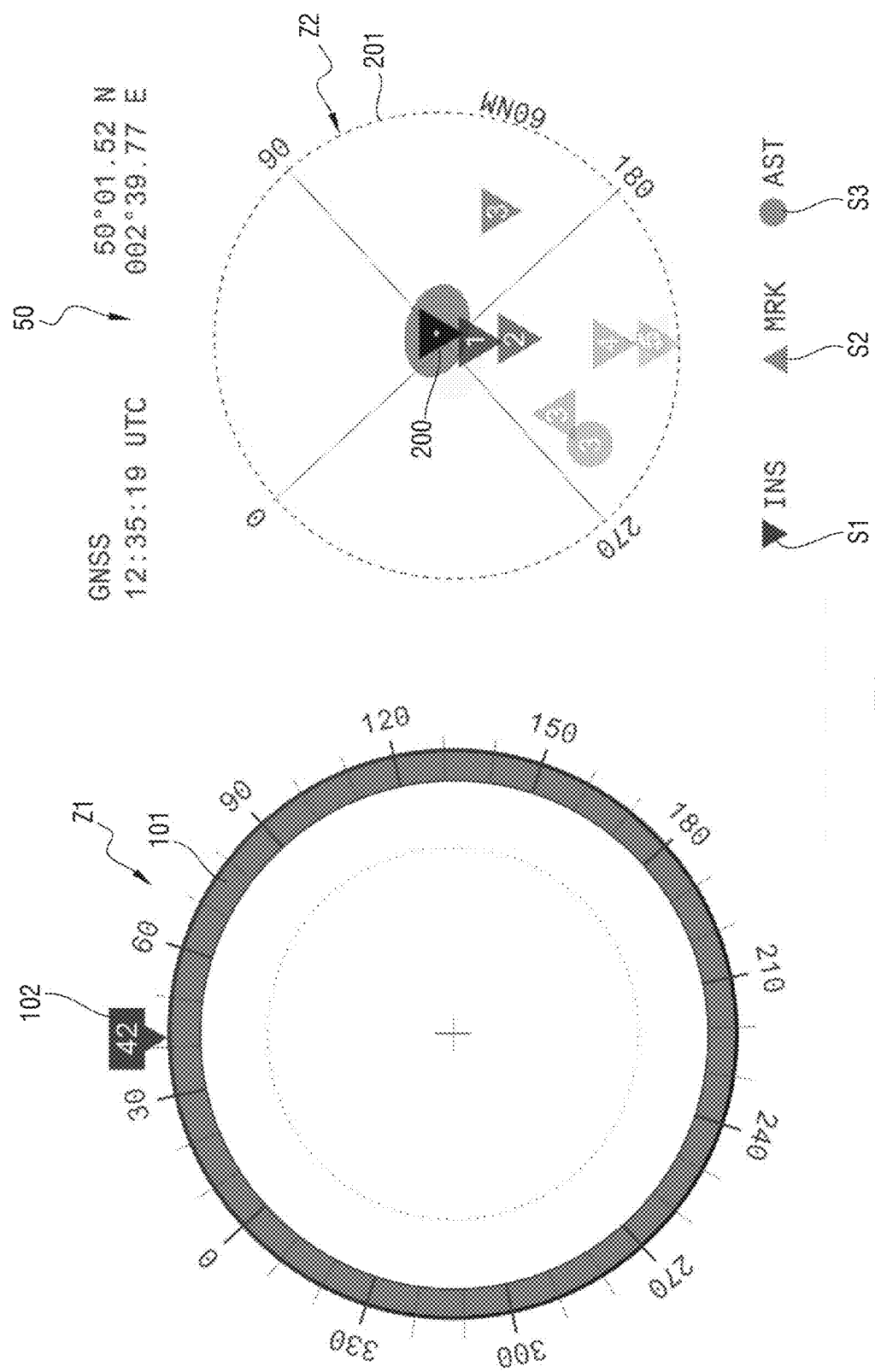

In FIG. 5, the symbols S1 and S2 having the chronological indicator "3" are offset to the left, while the symbol S3 having the chronological indicator "3" is offset to the right. Under such circumstances, it can be assumed that the two positions supplied respectively by the radar positioning device 30 and by the inertial positioning device 20 correspond to each other and that the clock signal supplied by the satellite positioning device 10, which is also used by the celestial positioning device 40, is faulty.

Figure 2:
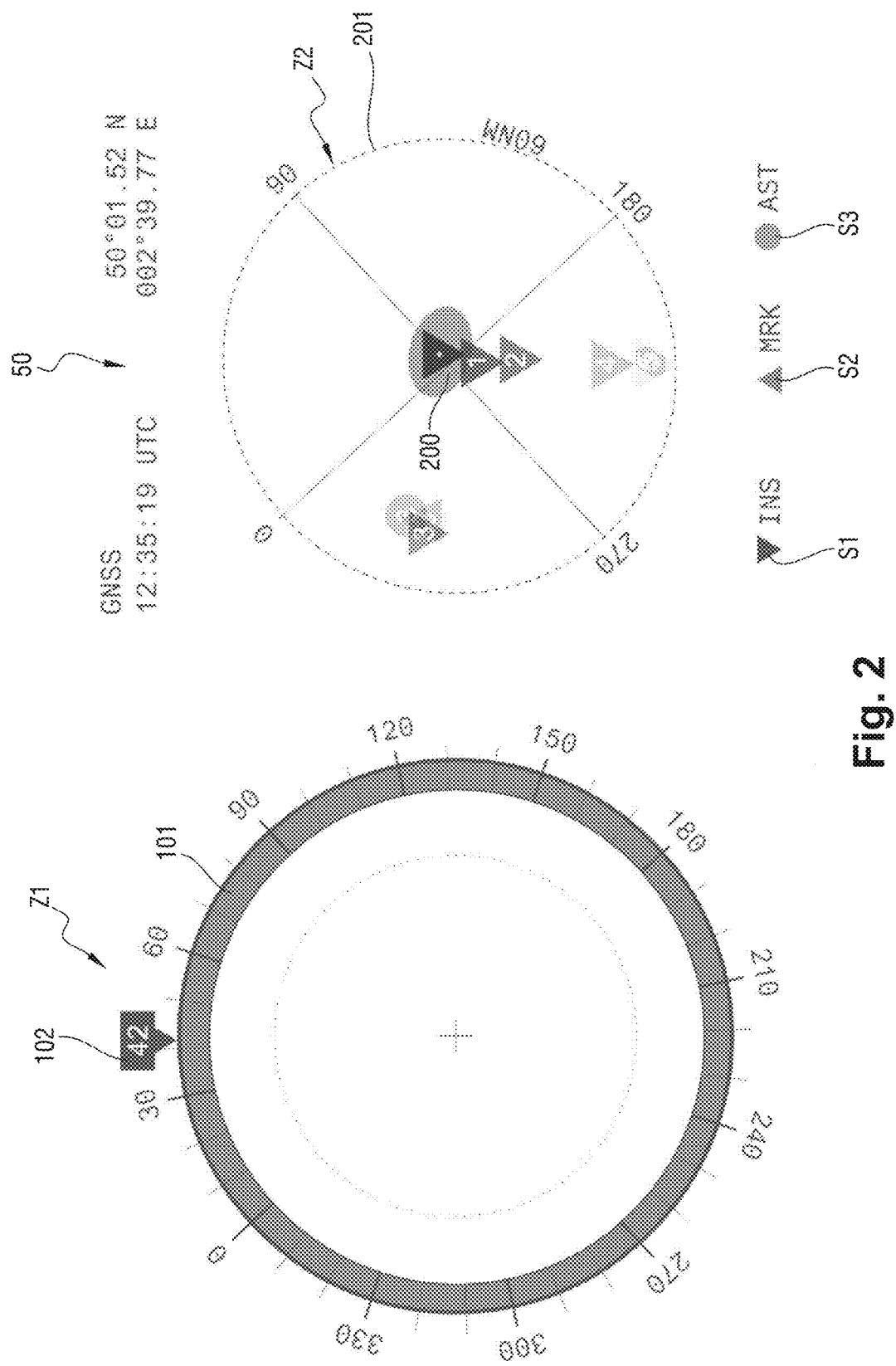
FIGS. 2 to 5 are elevation views of a display of the system for various different navigation situations.

The electronic control unit 1 is programmed to issue:

a fourth warning when the value of the first discrepancy is greater than the first threshold and the value of the second discrepancy is greater than the second threshold;

a fifth warning when the value of the first discrepancy is greater than the first threshold and the value of the third discrepancy is greater than the third threshold; and a sixth warning when the value of the first discrepancy is greater than the first threshold, the value of the second discrepancy is greater than the second threshold, and the value of the third discrepancy is greater than the third threshold (see for example FIGS. 2 and 5, where the symbols having the chronological indicator 3 are all offset).

By way of example, the warnings may be used to switch on a light on the screen 50, on the control panel of the bridge, and/or are listed in a report to which the crew has access.

The electronic control unit 1 is also programmed:

to calculate the difference between the clock signal supplied by the satellite positioning device 10 and the clock signal supplied by the inertial positioning device 20;

to issue a seventh warning if this difference has an absolute value greater than a fourth threshold; and to display a curve on the screen representing variation over time in the difference between the two clock signals, together with a limit corresponding to the fourth threshold.

By way of example, the seventh warning may be used to switch on a light on the screen 50, on the control panel of the bridge, and/or is listed in a report to which the crew has access.

Naturally, the invention is not limited to the implementation described, but covers any variant coming within the ambit of the invention as defined by the claims.

In particular, the invention can be used with positioning devices of other types. The vehicle may thus be fitted with an optoelectronic search module comprising a computer processor circuit connected to an optoelectronic image sensor mounted on a pointing member controlled by the computer processor circuit to point the optoelectronic image sensor to landmarks so that the computer processor circuit can calculate the current position of the vehicle.

The invention is equally applicable to a ship that is fitted with some other number of positioning devices, e.g. only two positioning devices, such as a satellite positioning device and an inertial positioning device.

The reference frame need not be centered or aligned on the heading.

A warning may be used for causing an offset symbol to be displayed only when it corresponds to a discrepancy that has exceeded the warning threshold.

The display may be organized in a manner different from that described.

The invention claimed is:

1. A method of assisting navigation of a vehicle fitted at least with a first positioning device and with a second positioning device, the method comprising the steps of:
   at predetermined instants, causing first positions of the vehicle to be determined by the first positioning device and second positions of the vehicle to be determined by the second positioning device, and calculating the value of a first discrepancy between each first position and the second position at the same instant; and
   comparing the value of the first discrepancy with a first threshold, and issuing a first warning when the value of the first discrepancy is greater than the first threshold;
   the method further comprising the steps of:
   defining on a screen of the vehicle both a reference point corresponding to a current position of the vehicle determined from the most recent first position and also a surrounding zone around the reference point and constituting a two-dimensional representation, at a predetermined scale and in a predetermined reference frame, of a portion of the space surrounding the vehicle; and
   symbolizing the first discrepancies on the screen by allocating a first symbol to each first discrepancy and by positioning each first symbol on the screen, relative to the reference point, while taking account both of the value of the first discrepancy and also of the path travelled by the vehicle since calculating the value of the first discrepancy, the first symbols being provided with respective chronological indicators.

2. The method according to claim 1, wherein an axis of the reference frame of the surrounding zone is continuously aligned on the heading followed by the vehicle.

3. A method of assisting navigation of a vehicle fitted at least with a first positioning device, with a second positioning device and with a third positioning device, the method comprising the steps of:
   at predetermined instants, causing first positions of the vehicle to be determined by the first positioning device and second positions of the vehicle to be determined by the second positioning device, and calculating the value of a first discrepancy between each first position and the second position at the same instant; and
   comparing the value of the first discrepancy with a first threshold, and issuing a first warning when the value of the first discrepancy is greater than the first threshold;
   the method further comprising the steps of:
   defining on a screen of the vehicle both a reference point corresponding to a current position of the vehicle determined from the most recent first position and also a surrounding zone around the reference point and constituting a two-dimensional representation, at a predetermined scale and in a predetermined reference frame, of a portion of the space surrounding the vehicle; and
   symbolizing the first discrepancies on the screen by allocating a first symbol to each first discrepancy and by positioning each first symbol on the screen, relative to the reference point, while taking account both of the value of the first discrepancy and also of the path travelled by the vehicle since calculating the value of the first discrepancy, the first symbols being provided with respective chronological indicators,
   the method further comprising the steps of:
   at the predetermined instants, causing third positions of the vehicle to be determined by the third positioning device, and calculating the value of a second discrepancy between the first position and the third position; and
   comparing the value of the second discrepancy with a second threshold, and issuing a second warning when the value of the second discrepancy is greater than the second threshold;
   the method further comprising the step of:
   symbolizing the second discrepancies on the screen by allocating a second symbol to each second discrepancy and by positioning each second symbol on the screen, relative to the reference point, while taking account both of the value of the second discrepancy and also of the path travelled by the vehicle since calculating the value of the second discrepancy, the second symbols being provided with respective chronological indicators.

4. The method according to claim 3, including the step of issuing a third warning when: the value of the first discrepancy is greater than the first threshold and the value of the second discrepancy is greater than the second threshold.

5. The method according to claim 3, wherein the third positioning device is a celestial positioning device.

6. The method according to any one of claim 3, wherein the third positioning device is a radar positioning device.

7. The method according to claim 1, wherein the first positioning device comprises an electronic unit for receiving and processing satellite signals.

8. The method according to claim 7, wherein the second positioning device comprises an inertial navigation unit.

9. The method according to claim 8, wherein the first positioning device and the second positioning device supply respective clock signals, and the method includes a step of calculating the difference between the clock signals relative to each other and of issuing a fourth warning if the difference has an absolute value greater than a third threshold.

10. The method according to claim 9, further including a step of displaying a curve on the screen, the curve representing variation over time in the difference between the clock signals, together with a limit corresponding to the third threshold.

11. The method according to claim 1, further including a step of modifying the appearance of the first symbol as a function of the value of the first discrepancy.

* * * * *